United States Patent
Dai (10) Patent No.: US 10,654,472 B2
(45) Date of Patent: May 19, 2020

(54) VEHICLE CONDITION DETECTION AND WARNING SYSTEM

(71) Applicant: Thunder Power New Energy Vehicle Development Company Limited, Central (HK)

(72) Inventor: Yu-Ting Dai, New Taipei (TW)

(73) Assignee: Thunder Power New Energy Vehicle Development Company Limited, Central (HK)

( * ) Notice: Subject to any disclaimer, the term of this patent is extended or adjusted under 35 U.S.C. 154(b) by 197 days.

(21) Appl. No.: 15/667,963

(22) Filed: Aug. 3, 2017

(65) Prior Publication Data

US 2017/0327146 A1 Nov. 16, 2017

Related U.S. Application Data

(62) Division of application No. 15/215,151, filed on Jul. 20, 2016, now Pat. No. 9,975,549, which is a division
(Continued)

(51) Int. Cl.
*B60W 30/08* (2012.01)
*G08G 1/0967* (2006.01)
(Continued)

(52) U.S. Cl.
CPC ............ *B60W 30/08* (2013.01); *B60T 8/172* (2013.01); *B60W 10/06* (2013.01); *B60W 10/18* (2013.01);
(Continued)

(58) Field of Classification Search
CPC ........ B60K 35/00; B60K 11/04; B60K 11/08; B60Q 1/00; G01C 21/26; G01C 21/32;
(Continued)

(56) References Cited

U.S. PATENT DOCUMENTS 6,163,277 A    12/2000  Gehlot
8,948,954 B1 *  2/2015  Ferguson ............... B60W 30/12
                                                701/23
(Continued)

FOREIGN PATENT DOCUMENTS

DE    102012025364 A1   7/2014
DE    202013010566 U1   2/2015

OTHER PUBLICATIONS

European Search Report for EP 16206430 dated May 17, 2017, 8 pages.
(Continued)

*Primary Examiner* — Behrang Badii
(74) *Attorney, Agent, or Firm* — Kilpatrick Townsend & Stockton LLP (57) ABSTRACT

Described herein is a vehicle system configured to identify and mitigate inappropriate driving behavior. In some embodiments, the vehicle system may receive input information from one or more input sensors. The vehicle system may identify driving behaviors related to a vehicle from the received input. The vehicle system may determine whether the driving behaviors are inappropriate in light of one or more conditions affecting the vehicle. Upon identifying inappropriate behavior, the vehicle system may generate a set of corrective actions capable of being executed to mitigate the inappropriate driving behavior.

19 Claims, 6 Drawing Sheets

Related U.S. Application Data of application No. 14/983,490, filed on Dec. 29, 2015, now Pat. No. 9,884,622.

(51) Int. Cl.

| | |
|---|---|
| *B60W 10/18* | (2012.01) |
| *B60W 10/30* | (2006.01) |
| *G08G 1/16* | (2006.01) |
| *B60W 10/06* | (2006.01) |
| *B60T 8/172* | (2006.01) |
| *B62D 5/04* | (2006.01) |
| *B62D 6/00* | (2006.01) |
| *B62D 6/04* | (2006.01) |
| *B62D 15/02* | (2006.01) |
| *G06K 9/00* | (2006.01) |
| *G08G 1/052* | (2006.01) |
| *G01C 21/26* | (2006.01) |
| *G01C 21/32* | (2006.01) |
| *G01C 21/36* | (2006.01) |
| *G07C 5/08* | (2006.01) |
| *B60K 35/00* | (2006.01) |
| *B60C 1/00* | (2006.01) |

(52) U.S. Cl.
CPC ........... *B60W 10/30* (2013.01); *B62D 5/0463* (2013.01); *B62D 6/00* (2013.01); *B62D 6/04* (2013.01); *B62D 15/025* (2013.01); *G06K 9/00845* (2013.01); *G08G 1/052* (2013.01); *G08G 1/096725* (2013.01); *G08G 1/096775* (2013.01); *G08G 1/164* (2013.01); *G08G 1/166* (2013.01); *G08G 1/167* (2013.01); *B60C 1/00* (2013.01); *B60K 35/00* (2013.01); *B60T 2201/03* (2013.01); *B60T 2201/08* (2013.01); *B60T 2220/02* (2013.01); *B60W 2540/30* (2013.01); *B60W 2555/20* (2020.02); *B60W 2710/0605* (2013.01); *B60W 2710/18* (2013.01); *B60W 2710/30* (2013.01); *G01C 21/26* (2013.01); *G01C 21/32* (2013.01); *G01C 21/36* (2013.01); *G07C 5/0825* (2013.01)

(58) Field of Classification Search
CPC .... G01C 21/36; G01C 21/3658; G05D 1/024; G05D 1/0011; G05D 1/0251; G05D 1/0274; G05D 1/0297; G07C 5/0825; G09B 19/167; G09B 29/007; G09B 29/00; B60L 50/16; B60L 11/18; B60L 3/00; B60L 1/02; G08G 1/167; G08G 1/052; G08G 1/096725; G08G 1/096775; G08G 1/164; G08G 1/166; G08G 1/16; B60W 50/14; B60W 10/18; B60W 30/08; B60W 10/30; B60W 2540/30; B60W 2550/12; B60W 2710/0605; B60W 1720/18; B60W 2710/30; G06F 17/00; G06F 19/00; G06F 3/0481; G06F 3/01; G06F 3/0488; G06F 3/00; G06F 3/041; B25J 9/0003; B25J 5/007; G06Q 50/01; G06Q 10/10; G06Q 20/3224; G06Q 30/02; G06Q 30/0241; B60H 1/14; B60H 1/00; B62D 5/0463; B62D 6/00; B62D 6/04; B62D 15/025; G06K 9/00845; G06K 9/00; B60T 2201/03; B60T 2201/08; B60T 2220/02; G06T 11/60; H01M 10/65; H01M 10/61; H01M 10/62; H01M 10/48; H01M 10/66; H01M 10/613; H01M 10/625; H01M 10/6557; H01M 10/663; H01M 10/6563; F16B 11/00; H02J 7/00; B29C 65/00; B32B 3/26; B32B 7/04; B60R 1/00; F25B 29/00; C09J 5/00

See application file for complete search history.

(56) References Cited

U.S. PATENT DOCUMENTS

| | | | |
|---|---|---|---|
| 9,129,460 B2 * | 9/2015 | McClellan | G07C 5/008 |
| 2002/0022927 A1 | 2/2002 | Lemelson et al. | |
| 2008/0027591 A1 * | 1/2008 | Lenser | G05D 1/0251 |
| | | | 701/2 |
| 2008/0147410 A1 | 6/2008 | Odinak | |
| 2008/0319602 A1 * | 12/2008 | McClellan | G07C 5/008 |
| | | | 701/31.4 |
| 2011/0231048 A1 | 9/2011 | Matsubara et al. | |
| 2011/0241864 A1 * | 10/2011 | Fujiki | B60K 35/00 |
| | | | 340/439 |
| 2011/0301802 A1 | 12/2011 | Rupp et al. | |
| 2012/0072064 A1 | 3/2012 | Kumazaki et al. | |
| 2012/0203557 A1 | 8/2012 | Odinak | |
| 2013/0179055 A1 | 7/2013 | Kato et al. | |
| 2013/0261916 A1 | 10/2013 | Sekiguchi | |
| 2014/0244162 A1 * | 8/2014 | Denaro | G01C 21/26 |
| | | | 701/437 |
| 2014/0279707 A1 * | 9/2014 | Joshua | G06Q 30/0283 |
| | | | 705/400 |
| 2014/0309806 A1 | 10/2014 | Ricci | |
| 2014/0309870 A1 | 10/2014 | Ricci et al. | |
| 2015/0012309 A1 | 1/2015 | Buchheim et al. | |
| 2015/0166061 A1 | 6/2015 | Wang et al. | |
| 2015/0202770 A1 * | 7/2015 | Patron | B25J 5/007 |
| | | | 700/245 |
| 2015/0232065 A1 | 8/2015 | Ricci et al. | |
| 2015/0276415 A1 | 10/2015 | Shrinath et al. | |
| 2017/0183002 A1 | 6/2017 | Dai | |
| 2017/0186321 A1 | 6/2017 | Dai | |

OTHER PUBLICATIONS

U.S. Appl. No. 15/215,151, filed Jul. 20, 2016 Non Final Rejection dated Aug. 25, 2017, all pages.
U.S. Appl. No. 14/983,490, filed Dec. 29, 2015, Non-Final Rejection dated Jul. 28, 2016, all pages.
U.S. Appl. No. 14/983,490, filed Dec. 29, 2015, Final Rejection dated Nov. 25, 2016, all pages.
U.S. Appl. No. 14/983,490, filed Dec. 29, 2015, Notice of Allowance dated Oct. 2, 2017, all pages.
European Patent Application No. 16206430.7-1203 Communication Pursuant to 94(3) dated Apr. 15, 2019, 6 pages.

* cited by examiner

VEHICLE CONDITION DETECTION AND WARNING SYSTEM

CROSS-REFERENCE TO RELATED APPLICATIONS

The present application is a divisional of U.S. Nonprovisional Application Ser. No. 15/215,151, filed Jul. 20, 2016, which is a divisional of U.S. Nonprovisional Application Ser. No. 14/983,490, filed Dec. 29, 2015, the entire contents of each of which are incorporated herein by reference for all purposes.

BACKGROUND

Road conditions can often make driving on roads unsafe. In some cases, certain driving behaviors exhibited by a driver may increase the dangers posed by a driving condition. Additionally, it is often difficult for a driver to assess a proper means of traversing conditions affecting the vehicle. For example, the driver may not have sufficient experience with driving in icy conditions to determine a safe traveling speed for such conditions. In some cases, it may be beneficial to warn a driver that a driving behavior is inappropriate or dangerous.

SUMMARY

The present disclosure solves these and other problems with the current technology. In particular, the disclosure provides a vehicle system capable of identifying and mitigating inappropriate driving behavior. The vehicle system may identify driving behaviors related to a vehicle and determine whether the driving behaviors are inappropriate in light of one or more conditions affecting the vehicle. Upon identifying inappropriate behavior, the vehicle system may generate a set of corrective actions capable of being executed to mitigate the inappropriate driving behavior.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing specific embodiments of the invention, some terms may be described in detail.

A "driving behavior" may be any driving pattern exhibited by a vehicle, whether initiated by an operator of the vehicle or not. In some embodiments, a driving behavior may comprise a speed at which the vehicle is traveling, a curvature of the vehicle's travel, a direction of the vehicle's travel, a sideways movement of the vehicle, and/or any other suitable vehicle movement indication.

A "vehicle system" may be any system comprising various components of a vehicle as well as any devices external to the vehicle that are configured to provide data to the vehicle. For example, a vehicle system may include a number of input sensors, a processor device capable of processing data from the input sensors, a service provider computer configured to perform one or more calculations with respect to the vehicle, a transmission means (e.g., a wireless platform) for enabling access between the processor device and the service provider computer, and any other suitable component.

A "set of corrective actions" may be any set of instructions determined to result in at least a partial reduction of the occurrence of one or more driving behaviors. A set of corrective actions may include one or more instructions to provide notifications and/or one or more instructions to initiate an action. For example, a set of corrective actions may include an instruction to provide a warning to an operator of a vehicle that the driving behavior is being exhibited. In another example, the set of corrective actions may include an instruction that causes the vehicle's braking system to activate, slowing the vehicle. In some embodiments, the set of corrective actions may include a number of instructions, each of which is separately determined to result in a reduction of the identified driving behavior. For example, the set of corrective actions may include instructions that cause an increase to the sensitivity of the vehicle's braking system as well as instructions that cause a decrease to the sensitivity of the vehicle's throttle system. In some embodiments, the instructions included in a set of corrective actions may be ordered or associated with timing data. For example, a set of corrective actions may include instructions to provide a notification, wait some period of time, determine whether the notification was successful in reducing the driving behavior, and perform a second action if the notification was not successful in reducing the driving behavior.

A "vehicle function component" may be any device capable of executing at least one function of a vehicle. For example, a master cylinder is a vehicle function component that executes a vehicle's braking function by applying hydraulic pressure to a brake disk. In some embodiments, the master cylinder may be signaled to execute the vehicle's brakes by a processor device. In some embodiments, the hydraulic pressure of the braking system may be increased at the master cylinder in order to increase the amount of braking force applied to the brake disk in response to an amount of movement of the brake pedal.

In some embodiments, a vehicle system may include a service provider computer (the provider of the service related to the vehicle system) and one or more vehicles. One or more input sensors located within a vehicle may collect information related to the vehicle. Upon receiving the input from the vehicle, a service provider may identify one or more driving behaviors exhibited by the vehicle. In addition, the service provider computer may identify one or more conditions that impact the vehicle. For example, the service provider may identify weather conditions that affect the vehicle.

Upon identifying driving behaviors exhibited by the vehicle, the service provider may determine whether the exhibited driving behavior is appropriate with respect to the identified conditions. If the service provider determines that the driving behavior is inappropriate in light of the conditions, then the service provider may generate a set of corrective actions calculated to mitigate the inappropriate driving conditions.

Figure 1:
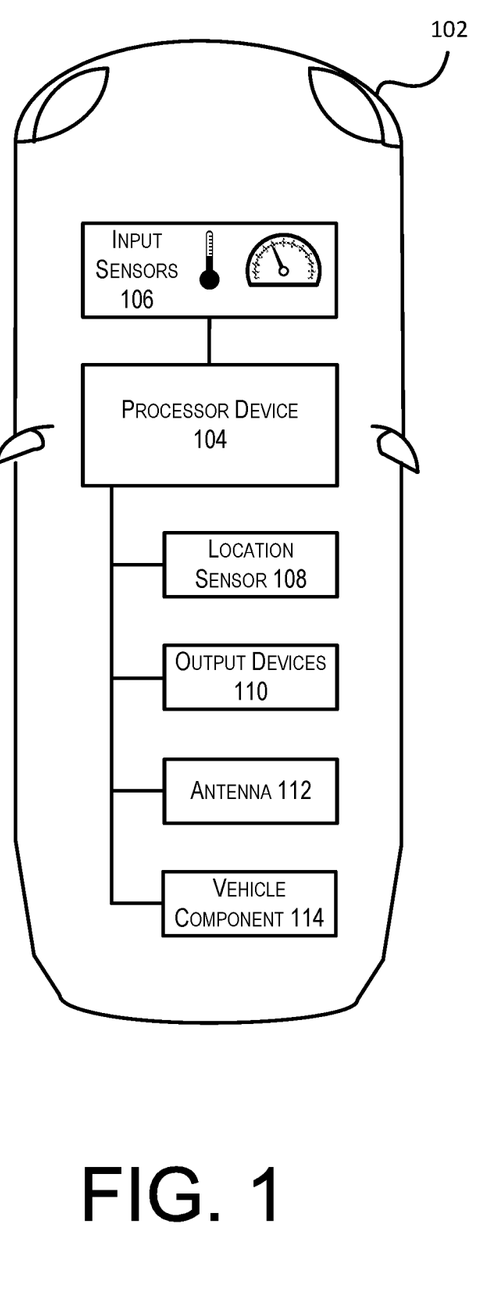
FIG. 1 depicts one or more components that may be included in a vehicle system in accordance with at least some embodiments.

FIG. 1 depicts one or more components that may be included in a vehicle system in accordance with at least some embodiments. For example, a vehicle 102 configured to interact with the vehicle system may include a processor device 104, a number of input sensors 106 capable of collecting various types of input, a location sensor 108 (e.g., a global positioning system device), one or more output devices 110, an antenna device capable of enabling communication between the processor device 104 and one or more external components, and one or more vehicle function components 114 configured to interact with a vehicle function.

In accordance with at least some embodiments, the processor device 104 included in the vehicle system may comprise any type of computing device capable of performing computations and executing machine executable instructions written in any suitable programming language. In some embodiments, the processor device may include an operating system and a basic input/output system (BIOS) configured to enable interaction between the operating system and one or more attached devices.

In accordance with at least some embodiments, the input sensors 106 included in the vehicle system may comprise any device capable of collecting data related to one or more vehicle conditions and reporting the data (or a processed form of the data) to the processor device. Some non-limiting examples of an input sensor may include an accelerometer, a camera, a microphone, a thermometer, a speedometer, a humidity sensor, a tire pressure gauge, a pressure sensor, or any other suitable sensing device.

In accordance with at least some embodiments, the location sensor 108 included in the vehicle system may comprise any device capable of ascertaining a location of the vehicle. For example, the location sensor may be a global positioning system (GPS) device. In another example, the location sensor may be a signal transmitter whose location may be determined by using a multilateration process on multiple radio signals output by various radio towers. In some embodiments, the location sensor 108 may continuously provide location data to the processor device 104. In some embodiments, the location sensor 108 may provide location updates to the processor device 104 periodically.

In accordance with at least some embodiments, the output devices 110 included in the vehicle system may comprise any device capable of providing a notification to an operator of a vehicle. In some embodiments, the output devices 110 may include a speaker and the notification may be provided as an audio notification. In some embodiments, the output devices may include a display device and the notification may be provided as a visual notification. For example, the notification may be provided as text and/or an image on a display screen of the display device.

In accordance with at least some embodiments, the antenna 112 included in the vehicle system may comprise any device capable of enabling wireless communication between the processor device and another electronic device. In some embodiments, the antenna may enable communication between the processor device and another electronic device via a wireless local area network (WLAN) such as Wi-Fi. In some embodiments, the antenna may enable communication between the processor device and another electronic device via a wireless communication network (e.g., 3G, 4G, etc.).

In accordance with at least some embodiments, the vehicle function component 114 included in the vehicle system may comprise any device capable of executing at least one function of a vehicle. In some embodiments, the vehicle function component may activate or deactivate one or more functionalities of the vehicle. In some embodiments, the vehicle function component may be configured to cause a sensitivity or other value associated with a vehicle functionality to be adjusted. For example, the vehicle function component may be used to increase the sensitivity of the brake pedal of the braking system (by adjusting the amount of braking force applied to a brake disk in response to an amount of movement of the brake pedal).

Figure 2:
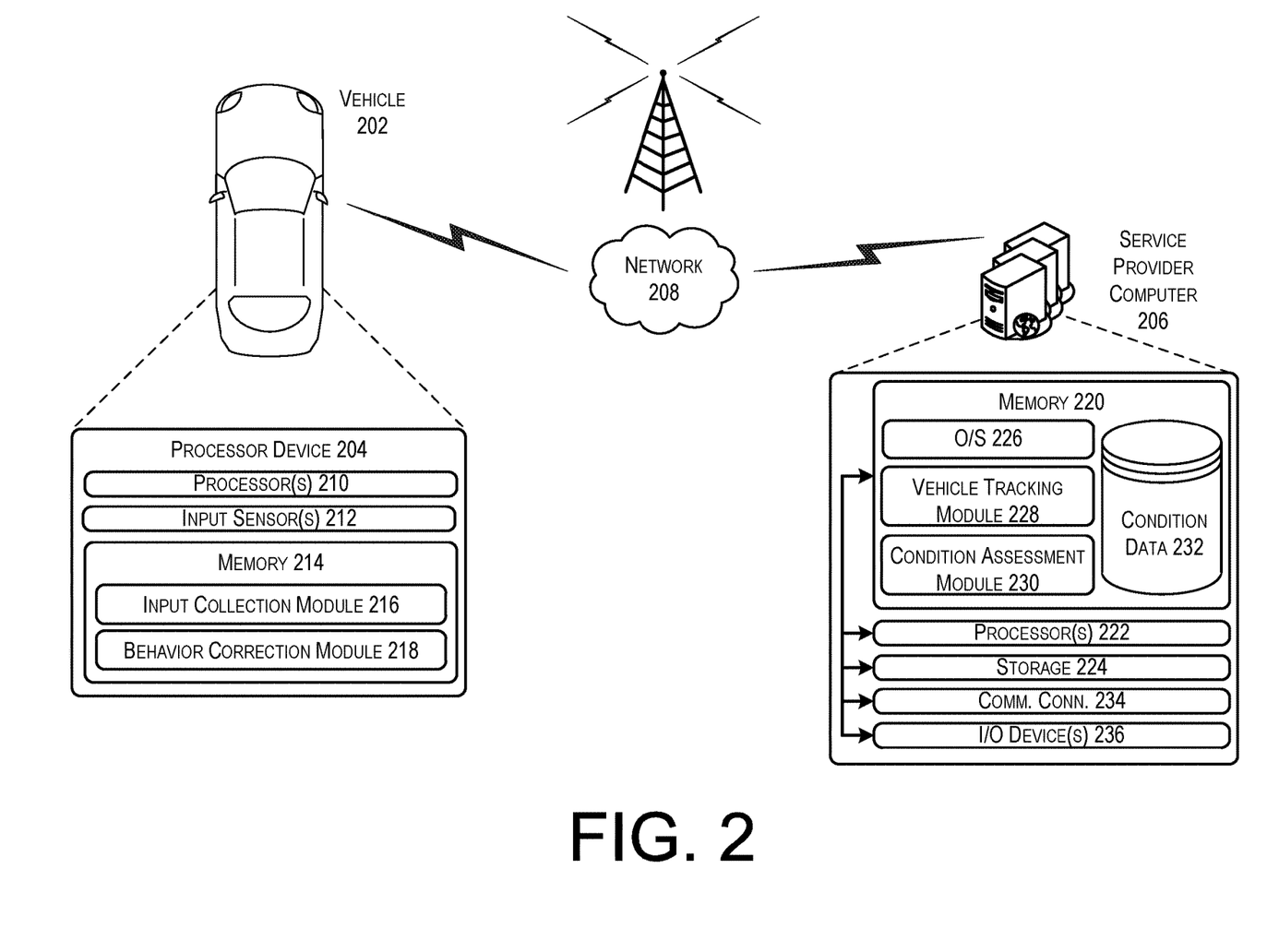
FIG. 2 depicts system or architecture in which techniques for assessing driving behavior with respect to vehicle conditions may be implemented in accordance with the disclosure.

FIG. 2 depicts system or architecture in which techniques for assessing driving behavior with respect to vehicle conditions may be implemented in accordance with the disclosure. In some examples, a vehicle 202 may include a processor device 204. In some embodiments, the processor device 204 may be configured to communicate with a service provider computer 206 via a network 208, or via other communication connections.

The processor device 204 may be any type of computing device capable of performing the described functions. The processor device 204 may include one or more processors 210 capable of processing input from one or more input sensors 212. As is known in the art, there are a variety of input sensors 212 capable of detecting input related to a user or vehicle conditions, such as accelerometers, cameras, microphones, thermometers, speedometers, etc. The input obtained by the input sensors 212 may be from a variety of data input types, including, but not limited to, audio data, visual data, or biometric data. Programmatic code for an application or module utilized in the implementation of at least some embodiments may be stored and executed from the memory 214 of processor device 204. The processor device 204 may include a module for processing input information collected from one or more input sensors 212 (input collection module 216) and/or a module for executing one or more actions intended to curb specified driving behavior (behavior correction module 218).

Turning to the contents of the memory 214 in more detail, the memory 214 may include the one or more application programs or services for implementing the features disclosed herein, including an input collection module 216 and/or a behavior correction module 218.

In some embodiments, an input collection module 216 may be configured to receive input information from one or more input sensors and identify information to be provided to the service provider computer 206. In some embodiments, one or more input types may be continuously provided to the service provider computer 206. In some embodiments, some input types may only be provided to the service provider computer 206 under specified conditions. For example, in some embodiments, the input detected by one or more input sensors 212 may be provided to the service provider computer 206 if it is associated with a value above (or below) a threshold value. In some embodiments, values associated with input from one input sensor may only be provided to the service provider computer 206 upon determining that a value associated with input from a second input sensor is above (or below) a threshold value. In some embodiments, values obtained from an input sensor may be provided to a service provider computer 206 upon determining that the values are abnormal. In some embodiments, values associated with input from an input sensor may be provided to the service provider upon receiving a request for the value from the service provider.

In some embodiments, a behavior correction module 218 may be configured to receive a set of behavior correction actions from a service provider computer 206 and to execute one or more of the actions. For example, in some embodiments, the behavior correction module 218 may be configured to provide a recommendation for correcting potentially dangerous driving behaviors. In some embodiments, the behavior correction module 218 may be configured to cause one or more functions of the vehicle to be activated. By way of example, the behavior correction module 218 may be configured to cause the initiation of a vehicle's braking system to correct speeding behavior. In another example, the behavior correction module 218 may be configured to cause a locking of a steering wheel within the vehicle.

In some examples, the network(s) 208 may include any one or a combination of many different types of networks, such as cable networks, the Internet, wireless networks, cellular networks, and other private and/or public networks. It is also noted that the described techniques may apply in other client/server arrangements, as well as in non-client/server arrangements (e.g., locally stored applications, peer to-peer systems, etc.). In an exemplary embodiment, the processor device 304 may communicate with a network hub using one or more wireless communication networks (e.g., 3G, 4G, etc.). The network hub may, in turn, utilize a physical connection (e.g., copper cable, T1, Ethernet, etc.) to communicate with the service provider computer at a network address.

The service provider computer 206 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that, in some embodiments, the service provider computer 206 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider computer 206 may include at least one memory 220 and one or more processing units (or processor(s)) 222. The processor(s) 222 may be implemented as appropriate in hardware, computer-executable instructions, firmware or combinations thereof. Computer-executable instruction or firmware implementations of the processor(s) 222 may include computer-executable or machine executable instructions written in any suitable programming language to perform the various functions described.

The memory 220 may store program instructions that are loadable and executable on the processor(s) 210 and/or processor(s) 222, as well as data generated during the execution of these programs. Depending on the configuration and type of service provider computer 206, the memory 220 may be volatile (such as random access memory (RAM)) and/or non-volatile (such as read-only memory (ROM), flash memory, etc.). The service provider computer 206 may also include additional storage 224, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 220 may include multiple different types of memory, such as static random access memory (SRAM), dynamic random access memory (DRAM) or ROM. Turning to the contents of the memory 220 in more detail, the memory 220 may include an operating system 226 and one or more application programs or services for implementing the features disclosed herein including at least a module for tracking vehicle location data (vehicle tracking module 228) and/or a module for assessing driving behavior with respect to vehicle conditions (condition assessment module 230). The memory 220 may also include condition data 232, which provides data related to conditions, including location-specific conditions. In some embodiments, the condition data 232 may be stored in a database.

The memory 220 and the additional storage 224, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the processor device 204 or the service provider computer 206. The service provider computer 206 may also contain communications connection(s) 234 that allow the service provider computer 206 to communicate with a stored database, another computing device or server, user terminals, and/or other devices on the network(s) 208. The service provider computer 206 may also include input/output (I/O) device(s) and/or ports 236, such as for enabling connection with a keyboard, a mouse, a pen, a voice input device, a touch input device, a display, speakers, a printer, etc.

Turning to the contents of the memory 220 in more detail, the memory 220 may include an operating system 226, a database containing condition data 232, and the one or more application programs or services for implementing the features disclosed herein, including a vehicle tracking module 228 and/or a condition assessment module 230.

In some embodiments, the vehicle tracking module 228 may be configured to receive an indication of a vehicle's location information from a processor device 204. The vehicle tracking module may be configured to identify driving behaviors that may be relevant to a vehicle. For example, the vehicle tracking module 228 may identify a driving behavior exhibited by a vehicle based on that vehicle's current and past location data and/or the input received from the processor device 204. The vehicle tracking module 228 may compare the vehicle's current and past location data to predetermined driving behavior data. In some embodiments, the vehicle tracking module may periodically update the vehicle's location based on the received location information and identify any new driving behaviors relevant to the vehicle. Upon detecting a driving behavior relevant to the vehicle, the service provider may communicate the driving behavior to a condition assessment module 230 to determine whether a current driving behavior exhibited by the vehicle is appropriate in light of one or more conditions affecting the vehicle. In some embodiments, the vehicle tracking module 228 may track multiple vehicles simultaneously.

In some embodiments, the condition assessment module 230 may be configured to receive an indication of one or more driving behaviors from the vehicle tracking module 228, determine whether the driving behaviors are appropriate in light of one or more conditions relevant to the vehicle, and generate a set of corrective actions for a vehicle. In some embodiments, the condition assessment module 230 may query a condition database 232 to identify one or more driving conditions that are relevant to the vehicle. In some embodiments, the condition assessment module 230 may identify conditions that are location specific. For example, the condition assessment module 230 may identify weather conditions local to the vehicle. In another example, the condition assessment module may identify a curvature of a road that the vehicle is currently traversing. In some embodiments, the condition assessment module 230 may receive input from one or more input sensors of the vehicle that indicate a condition of the vehicle.

In some embodiments, the service provider may maintain a database of corrective actions that may be taken in response to detecting an inappropriate driving behavior with respect to vehicle conditions. In this example, once the condition assessment module 230 has identified a driving behavior relevant to the vehicle, the service provider may then query the database to identify an appropriate action to correct the driving behavior. In some embodiments the condition assessment module 230 may compile a set of corrective actions configured to mitigate various driving behaviors. Once the condition assessment module 230 has generated a set of corrective actions, the set of corrective actions may be communicated to the processor device 204.

Although depicted in FIG. 2 as being included in the processor device 204 or the service provider computer 206, it should be noted that any of the modules described may be implemented on either the processor device 204 or the service provider computer 206, regardless of where they are depicted. For example, in some embodiments, the vehicle tracking module 228 and/or the condition assessment module 230 may be implemented on, and executed from, the processor device 204. In embodiments in which one or more of the modules are included at the service provider, the processor device 204 may transmit information obtained from the input sensors to the service provider computer 206 to be processed by the service provider. For example, the processor device 204 may provide streaming location data to the service provider computer 206.

Figure 3:
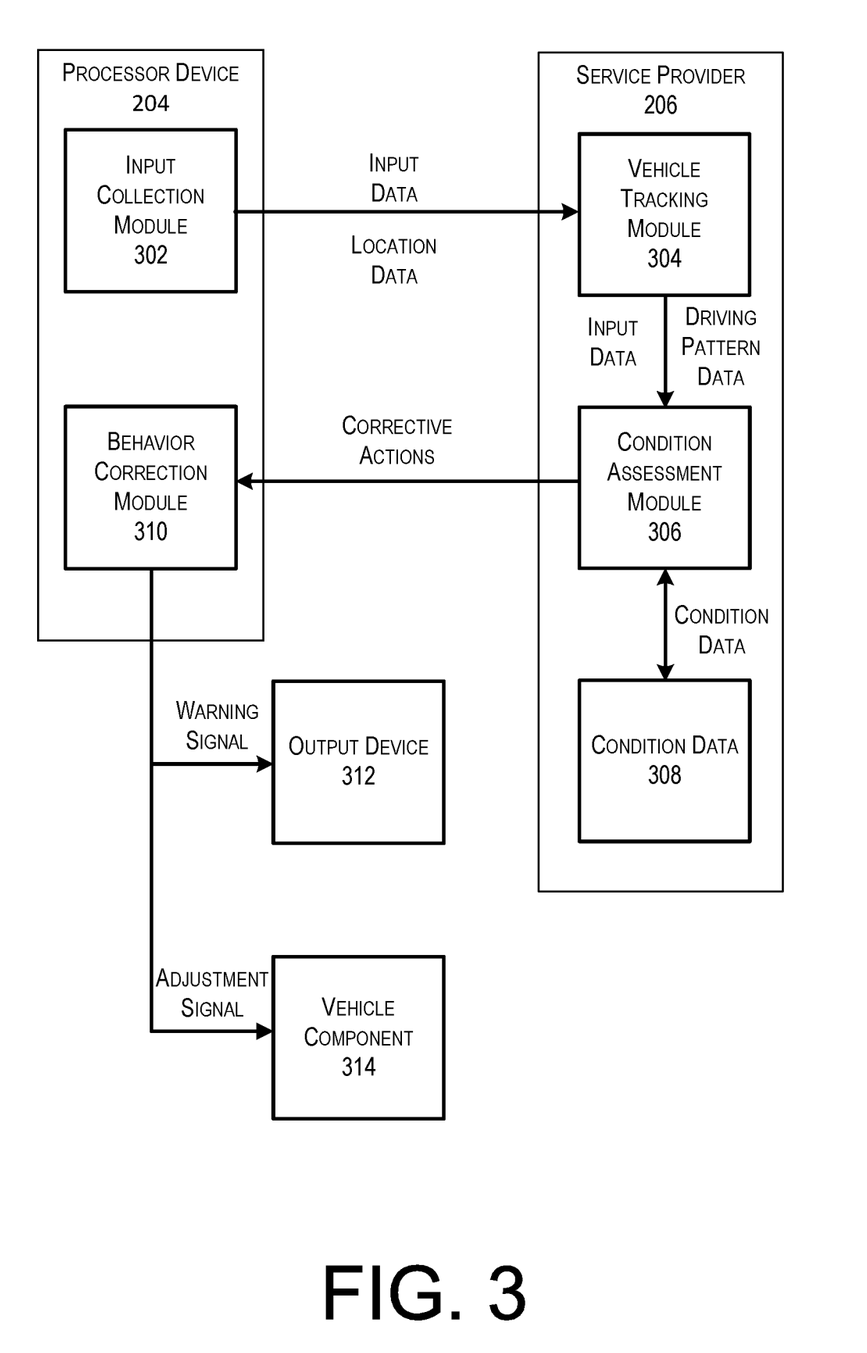
FIG. 3 depicts an illustrative flow diagram illustrating a process for correcting driver behavior in accordance with at least some embodiments.

FIG. 3 depicts an illustrative flow diagram illustrating a process for correcting driver behavior in accordance with at least some embodiments. In FIG. 3, a vehicle system may include one or more processor devices 204. The processor device 204 may be an example processor device 204 of FIG. 2. Location data and/or input data captured by the one or more processor devices 204 may be transmitted to, and processed at, a service provider 206. The service provider 206 may be an example service provider 206 of FIG. 2.

As described above, the processor device may include an input collection module 302 configured to collect input related to a vehicle and transmit that input to a vehicle tracking module 304 at the service provider computer 206. In some embodiments, the input collection module 302 may be configured to determine whether input collected by the one or more input sensors is within an expected range. For example, in some embodiments, the input detected by one or more input sensors may be identified as being relevant to a vehicle condition or driving behavior if it is associated with a value above (or below) a threshold value. In some embodiments, values associated with input from one input sensor may only be provided to the vehicle tracking module 304 upon determining that a value associated with input from a second input sensor is above (or below) a predetermined value. The input collection module 302 may collect input from a variety of different input sensors and provide the input to the vehicle tracking module 304. For example, the input sensors may collect data related to the vehicle's speed, the vehicle's external temperature, the vehicle's tire pressure, or any other suitable vehicle metric. Once the input has been collected by the input collection module 302, the input may be provided to a vehicle tracking module 304 on a service provider computer 206.

The vehicle tracking module 304 may be configured to identify one or more driving behaviors exhibited by a vehicle based on that vehicle's current and past location data and/or the input received from the processor device 204. The vehicle tracking module 228 may analyze the vehicle's current and past location data to predetermined driving behavior data. For example, the vehicle tracking module 228 may determine a vehicle's location at a first time and the vehicle's location at a second time. The vehicle tracking module 228 may then determine a speed and or direction of the vehicle. In some embodiments, the vehicle tracking module may periodically update the vehicle's location based on the received location information and identify any new driving behaviors relevant to the vehicle. Upon detecting a driving behavior relevant to the vehicle, the service provider may communicate the driving behavior to a condition assessment module 306 to determine whether a current driving behavior exhibited by the vehicle is appropriate in light of one or more conditions affecting the vehicle. In some embodiments, the vehicle tracking module 228 may track multiple vehicles simultaneously.

Upon receiving driving behavior information for a vehicle from the vehicle tracking module 228, the condition assessment module 306 may be configured to determine whether the driving behaviors are appropriate in light of one or more conditions relevant to the vehicle. Upon determining that the driving behaviors are inappropriate, the condition assessment module 306 may be configured to generate a set of corrective actions for the vehicle. In some embodiments, the condition assessment module 306 may query a condition database 308 and receive condition information relevant to the vehicle. In some embodiments, the conditions identified may be location specific. For example, the condition assessment module 306 may receive condition information on weather conditions local to the vehicle. In another example, the condition assessment module may identify a curvature of a road that the vehicle is currently traversing. In some embodiments, the condition assessment module 306 may receive input from one or more input sensors of the vehicle that indicate a condition of the vehicle. For example, the condition assessment module 306 may receive an indication of a temperature outside the vehicle. Upon determining that the temperature outside the vehicle is at 0° or below, the condition assessment module 306 may determine that the vehicle is traveling in icy conditions.

In some embodiments, the condition assessment module 306 may generate a set of corrective actions for the vehicle. For example, the service provider computer 206 may maintain a database or other storage means that includes one or more actions that may be executed to mitigate an inappropriate driving behavior. In this example, upon determining that the vehicle is exhibiting inappropriate driving behaviors, the condition assessment module may query the database to identify a corrective action that correlates to each of the identified inappropriate driving behaviors. In some embodiments, the condition assessment module 306 may identify a corrective action which, when executed, may mitigate multiple inappropriate driving behaviors. The condition assessment module 306 may compile each of the identified corrective actions into a set of corrective actions, which may subsequently be provided to a behavior correction module 310 executed on the processor device 204.

The behavior correction module 310 may be configured to execute one or more corrective actions in order to mitigate an inappropriate driving behavior. In some embodiments, the behavior correction module 310 may be configured to provide a notification to an operator of the vehicle. To do this, the behavior correction module may transmit a warning signal to an output device 312. For example, the behavior correction module may transmit an audio notification to the vehicle's speaker system. In some embodiments, the behavior correction module 310 may be configured to cause a vehicle function to be initiated. To do this, the behavior correction module 310 may be configured to transmit an adjustment signal to a vehicle component 314 configured to execute on or more vehicle functions. For example, the behavior correction module 310 may be configured to transmit a signal to the vehicle's braking system that causes the braking system to be activated.

In accordance with at least some embodiments, the behavior correction module may be configured to determine that a vehicle is exhibiting a particular driving behavior. Upon executing one or more corrective actions, the behavior correction module 310 may subsequently determine if the driving behavior has ceased. In some embodiments, the set of corrective actions may include multiple corrective actions determined to mitigate a single driving behavior. The corrective behavior module 310 may be configured to execute each of these actions in a sequence. For example, the behavior correction module 310 may execute a first action. Upon determining that the first action was ineffective and the driving behavior is still being exhibited, the behavior correction module 310 may execute a second action. By way of illustrative example, the behavior correction module may determine that a vehicle is speeding. Upon making this determination, the behavior correction module 310 may first provide a warning or recommendation to the driver to reduce the speed of the vehicle. After a predetermined time, the behavior correction module 310 may determine that the speed of the vehicle has not decreased. Upon making that determination, the behavior correction module 310 may execute an action to apply the braking system and slow the vehicle.

Figure 4:
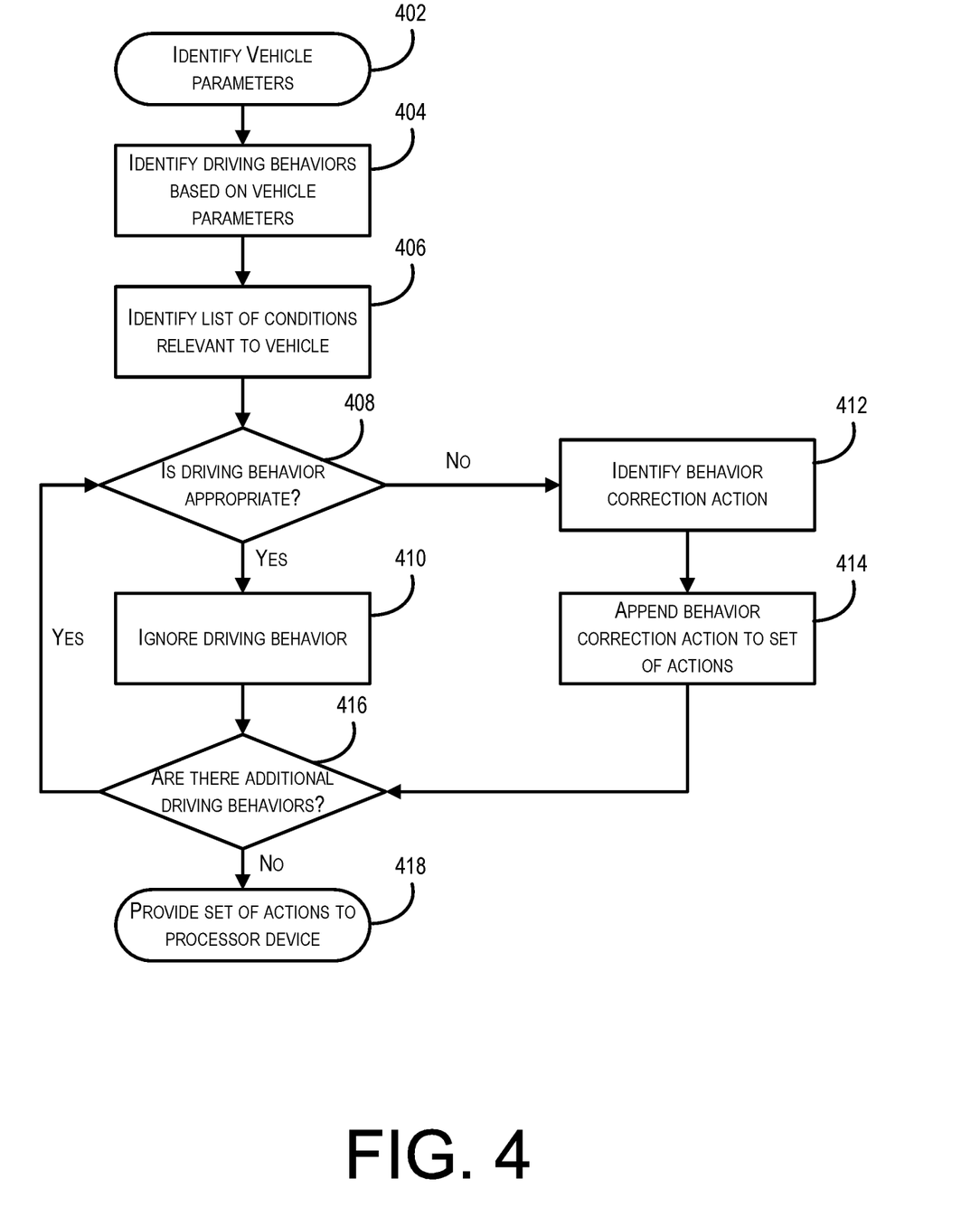
FIG. 4 depicts an illustrative flow chart showing a process that may be performed at a server external to a vehicle in accordance with at least some embodiments.

FIG. 4 depicts an illustrative flow chart showing a process that may be performed at a server external to a vehicle in accordance with at least some embodiments. The process 400 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 400 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 400 of FIG. 4 may be performed by at least the one or more service provider computer 206 shown in FIG. 2. The code may be stored on a computer-readable storage medium, for example, in the form of a computer program including a plurality of instructions executable by one or more processors. The computer-readable storage medium may be non-transitory.

Process 400 may begin at 402, when vehicle parameters are identified with respect to a vehicle. The vehicle parameters may be received from the vehicle itself or from a vehicle monitoring system. The process 400 may identify the vehicle driving behaviors based at least in part on the identified vehicle parameters at 404. In some embodiments, the process may identify vehicle movement patterns from vehicle location information. The vehicle movement patterns may correlate to vehicle movement patterns stored in a movement pattern database.

Once the process 400 has identified driving behaviors exhibited by the vehicle, it may determine one or more conditions that may potentially impact the vehicle at 406. For example, local weather patterns may be identified. In another example, the process may identify details related to the roads upon which the vehicle is traveling. The process may subsequently determine whether each of the identified driving behaviors is appropriate under the identified conditions.

For each of the identified driving behaviors, the process 400 may determine whether the identified driving behavior is appropriate in view of the conditions at 408. For example, one or more values associated with the driving behavior may be compared to a range of acceptable values. In some embodiments, the range of acceptable values may be determined based on the identified conditions. Upon determining that the driving behavior is within a range of acceptable values, the driving behavior may be ignored at 410. If the driving behavior is outside the range of acceptable values, then the process may determine that the driving behavior is inappropriate. As illustration, a value of current driving speed may be determined and this value may be compared to a range of acceptable speed values predetermined for a segment of road in which the vehicle is traveling. For instance, the predetermined speed values may specify a maximum speed value of 70 miles one hour and a minimum value of 55 miles one hour such that this range represents safe driving required for this segment of road. As another illustration, a value of current driving speed variation may be determined, for example a 40 mile/hour variation. This may indicate that driver is suddenly speeding or slowing down erratically, which could mean the driver is engaging in racing like driving behavior. A range of driving variation, e.g., 5-10 miles/hour may be compare to the current driving speed variation value to determine if the driver is engaging dangerous driving behavior.

Upon identifying inappropriate behavior, the process may identify one or more corrective actions capable of correcting the inappropriate behavior at 412. Upon identifying a corrective action, the process may determine whether the identified corrective actions is an effective one. Each of the identified corrective actions may be appended to a set of corrective actions at 414. After assessing each driving behavior, the process may determine whether any other driving behaviors should be evaluated at 416. Upon determining that the no other driving behaviors are present, the process may terminate by providing the set of corrective actions to a processor device of a vehicle at 418.

Figure 5:
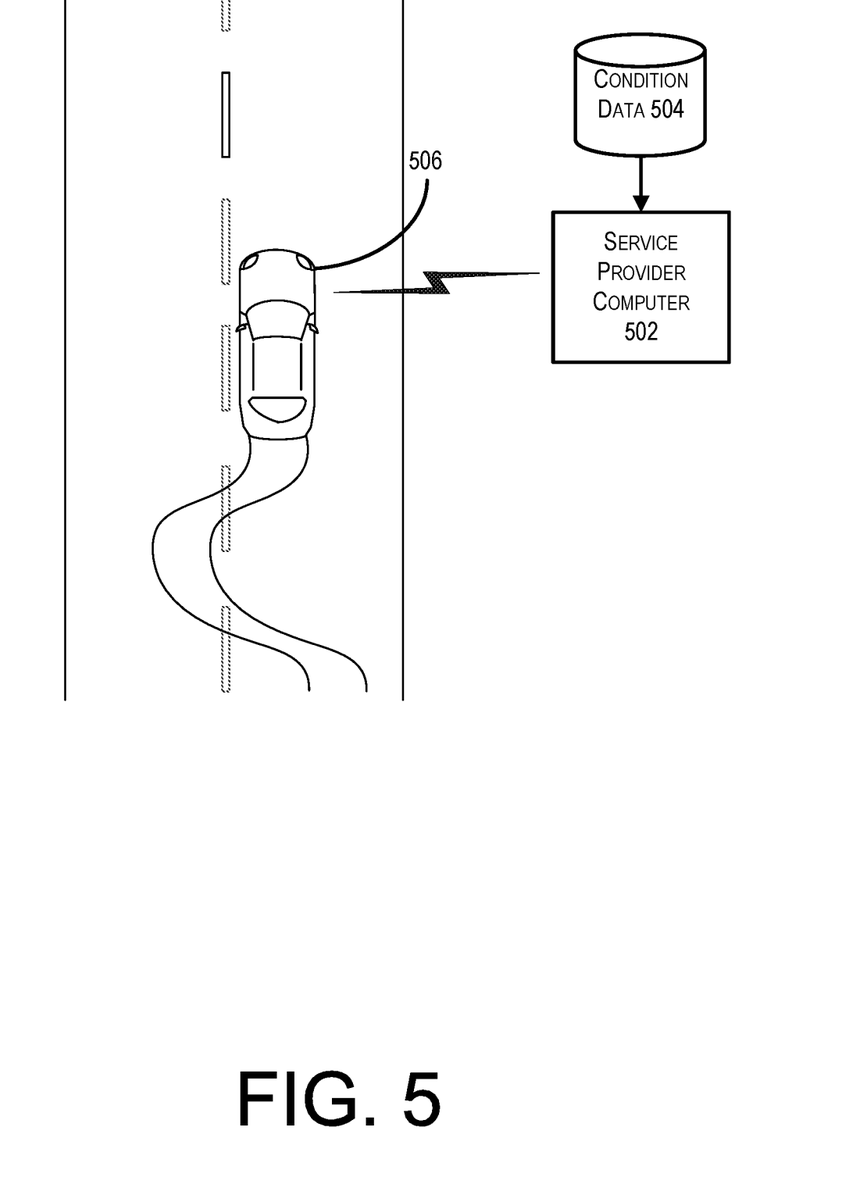
FIG. 5 depicts an illustrative example implementation of the vehicle system in accordance with at least some embodiments.

FIG. 5 depicts an illustrative example implementation of the vehicle system in accordance with at least some embodiments. In FIG. 5, a service provider 502 may have access to one or more databases of condition data 504. The service provider may be in communication with one or more vehicles 506 via a wireless communication means.

In some embodiments, the condition data 504 may be maintained by a third party entity (an entity unaffiliated with the service provider). For example, the service provider 502 may access a weather database maintained by a weather monitoring service. In some embodiments, the condition data 504 may comprise multiple databases. For example, the condition data 504 may be separated by a type of the condition or a geographic location.

By way of illustration, consider a scenario in which a vehicle 506 is exhibiting driving behavior consistent with swerving (moving in a zigzagging pattern). In this illustrative example, the service provider 502 may determine that the road that the vehicle is traveling on is straight, or at least does not follow the curvature patterns consistent with the driving pattern exhibited. Upon determining, from the received vehicle location information, that the vehicle is exhibiting driving behavior inconsistent with the curvature of the road, the service provider may determine that the vehicle is swerving. In this illustrative example, the service provider 502 may determine that activating an electronic stability control system may mitigate the swerving behavior. In addition, the service provider may determine that locking the steering wheel column of the vehicle may also mitigate the driving behavior. In this example, the service provider 502 may generate a set of corrective actions that include these potentially mitigating actions.

In the described example, the service provider 502 may transmit the set of corrective actions to the vehicle 506 to be executed. In some embodiments, the vehicle may execute the corrective actions sequentially. For example, the electronic stability control system of the vehicle may be initiated first. Upon determining that the vehicle is still swerving, the vehicle's steering column may be locked in order to prevent further swerving.

Figure 6:
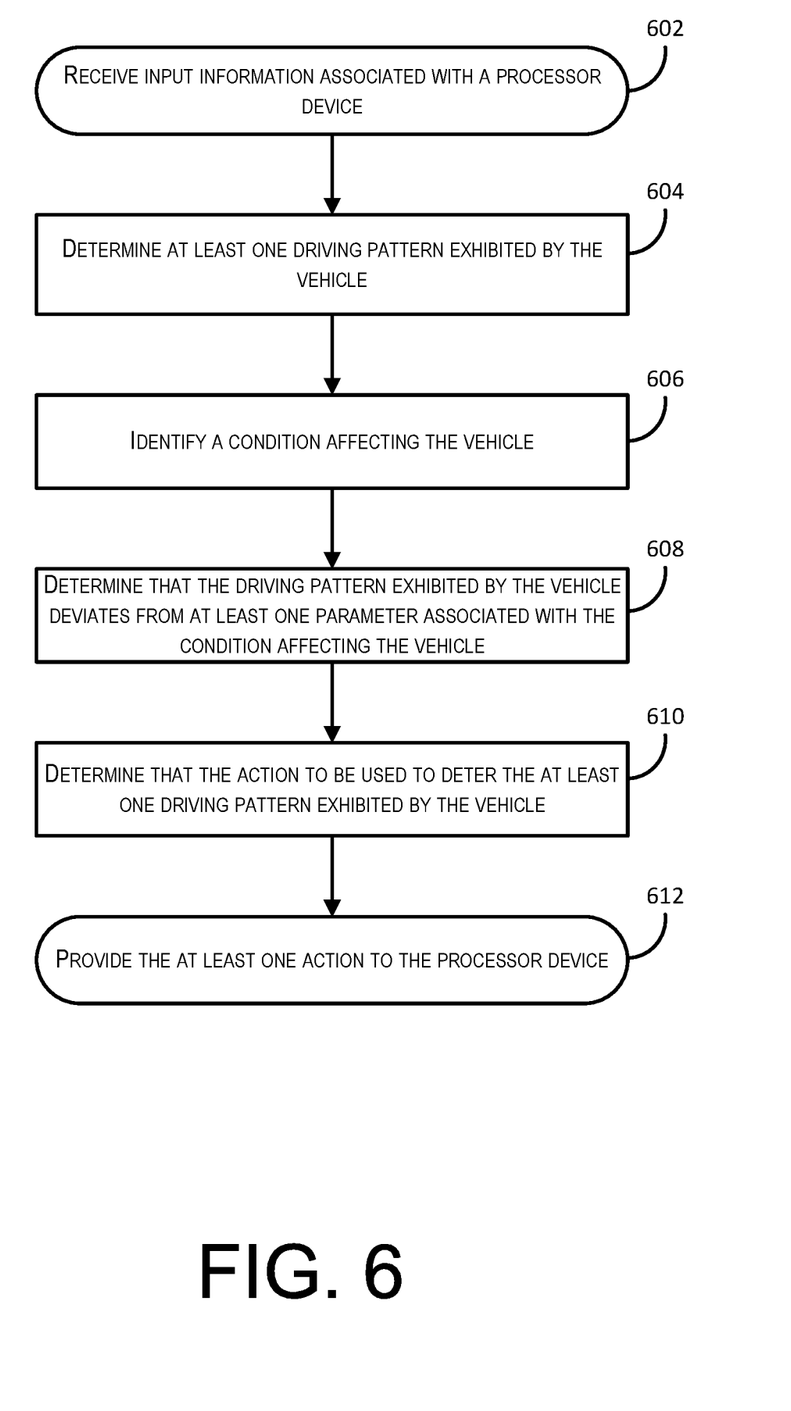
FIG. 6 depicts an illustrative flow diagram showing a process for identifying and correcting inappropriate driving behavior in accordance with at least some embodiments.

FIG. 6 depicts an illustrative flow diagram showing a process for identifying and correcting inappropriate driving behavior in accordance with at least some embodiments. Process 600 may begin at 602, when input information associated with a processor device is received from one or more input sensors. The input information may be assessed to identify one or more driving pattern exhibited by a vehicle in which the processor device is installed at 604. For example, the input information may be compared to stored driving pattern information to identify similarities. In some embodiments, this portion of the process may be performed by the processor device itself. In some embodiments, this portion of the process may be performed by a service provider computer external to the vehicle.

In some embodiments, the process may identify one or more conditions relevant to the vehicle at 606. The identified relevant conditions may be any condition that may affect the driving behavior of, or probability of an accident for, a vehicle. For example, the conditions may comprise local weather conditions, a temperature external to the vehicle, a curvature of a road that the vehicle is traveling upon, or any other suitable condition that may affect the vehicle.

Once driving patterns and conditions have been identified, the process may determine whether the driving behavior is appropriate in light of the conditions at 608. In some embodiments, this may be determined by comparing a value associated with the driving behavior with a threshold or a range of acceptable values. Upon determining that the value associated with the driving behavior is outside of the acceptable range of values, the process may determine that the driving behavior is inappropriate. The process may subsequently identify one or more actions intended to cease the inappropriate driving behavior at 610. In some embodiments, the actions may be identified based on a type of driving behavior exhibited. For example, if the vehicle is traveling to fast, then the process may identify actions intended to prevent vehicle speeding. In this example, the process may identify an action to activate the vehicle's braking system, an action to decrease the sensitivity of the vehicle's throttle, an action to warn the operator of the vehicle that the vehicle is speeding, or any other appropriate action. The process may identify one or more actions for each of the identified inappropriate driving behaviors and compile a set of actions to be executed by the processor device installed within the vehicle. This compiled set of actions may be provided to the processor device at 612.

By way of illustrative example, consider the scenario in which a processor device determines that a vehicle is traveling at 40 miles per hour. The process 600 may determine that the speed limit on the road is 40 miles per hour and that it is currently raining. The processor device may also receive an indication that the vehicle's tire pressure is low. The process may calculate that, in light of the wet road conditions and the low tire pressure, a safe traveling speed for this vehicle may be 25-28 miles per hour. The process may then determine that a traveling speed of 40 miles per hour is inappropriate. Upon making this determination, the process may compile a list of actions intended to reduce the speed of the vehicle to within the desired range.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A vehicle system, comprising:
    a processor device; and
    a memory including instructions that, when executed with the processor device, cause the system to, at least:
        identify a driving pattern corresponding to a present driving behavior exhibited by a vehicle;
        identify a weather condition within a vicinity of the vehicle as affecting the driving behavior of the vehicle;
        determine a set of corrective actions to stop the driving behavior responsive to determining, based at least in part on the one or more conditions, that the driving behavior exhibited by the vehicle is inappropriate based on comparing a value associated with the driving behavior with a threshold or a range of acceptable values for the driving behavior associated with driving under the weather condition; and
        cause the set of corrective actions to be executed by the vehicle sequentially, such that each of the set of corrective actions is executed only in response to determining that the driving behavior exhibited by the vehicle remains inappropriate after execution of a preceding one of the set of corrective actions.

2. The vehicle system of claim 1, wherein the driving pattern is identified using location information for the vehicle.

3. The vehicle system of claim 1, wherein the processor device is installed within the vehicle.

4. The vehicle system of claim 1, wherein the processor device is installed in a server external to the vehicle.

5. The vehicle system of claim 1, wherein the driving pattern exhibited by the vehicle comprises the vehicle traveling too fast.

6. The vehicle system of claim 1, wherein the driving pattern exhibited by the vehicle comprises swerving of the vehicle.

7. The vehicle system of claim 1, wherein the action to stop the driving pattern comprises activating a braking system of the vehicle.

8. A method comprising:
    identifying a driving pattern corresponding to a present driving behavior exhibited by a vehicle;
    identifying a weather condition within a vicinity of the vehicle as affecting the driving behavior of the vehicle;
    determining a set of corrective actions to stop the driving behavior responsive to determining, based at least in part on the one or more conditions, that the driving behavior exhibited by the vehicle is inappropriate based on comparing a value associated with the driving behavior with a threshold or a range of acceptable values for the driving behavior associated with driving under the weather condition; and
    causing the set of corrective actions to be executed by one or more components of the vehicle sequentially, such that each of the set of corrective actions is executed only in response to determining that the driving behavior exhibited by the vehicle remains inappropriate after execution of a preceding one of the set of corrective actions.

9. The method of claim 8, further comprising:
    receiving location information associated with the vehicle, wherein the one or more conditions affecting the vehicle is identified based at least in part on the location information.

10. The method of claim 8, wherein the one or more conditions affecting the vehicle comprises at least a weather condition.

11. The method of claim 8, wherein the one or more conditions affecting the vehicle comprises at least a curvature of a road that the vehicle is traveling upon.

12. The method of claim 8, wherein the driving pattern exhibited by the vehicle is identified by comparing input information received from one or more input sensors installed on the vehicle to predetermined driving pattern information.

13. The method of claim 12, wherein the input information is received from at least one of an accelerometer, a camera, a microphone, a thermometer, a speedometer, a humidity sensor, a tire pressure gauge, or a pressure sensor.

14. The method of claim 8, wherein causing the action to be executed by one or more components of the vehicle comprises providing computer executable instructions that, when executed, cause the action to be initiated by the one or more components.

15. A vehicle apparatus, comprising:
one or more input sensors installed in the vehicle; and
a processor device, installed in the vehicle, in communication with the one or more input sensors, and configured to:
   identify, using the one or more input sensors, a driving pattern corresponding to a present driving behavior exhibited by a vehicle;
   identify a weather condition within a vicinity of the vehicle as affecting the driving behavior of the vehicle;
   determine a set of corrective actions to stop the driving behavior responsive to determining, based at least in part on the one or more conditions, that the driving behavior exhibited by the vehicle is inappropriate based on comparing a value associated with the driving behavior with a threshold or a range of acceptable values for the driving behavior associated with driving under the weather condition; and
   cause the set of corrective actions to be executed by the vehicle sequentially, such that each of the set of corrective actions is executed only in response to determining that the driving behavior exhibited by the vehicle remains inappropriate after execution of a preceding one of the set of corrective actions.

16. The vehicle apparatus of claim 15, wherein one or more conditions affecting the vehicle is identified based on a location of the vehicle, the vehicle being within a predetermined distance of a location of the one or more conditions.

17. The vehicle apparatus of claim 15, further comprising an antenna device configured to enable communication between the vehicle apparatus and a service provider computer.

18. The vehicle apparatus of claim 17, wherein the processor device is further configured to:
   provide input information obtained by the one or more input sensors to the service provider; and
   receive an indication of the driving pattern exhibited by the vehicle from the service provider computer.

19. The vehicle system of claim 1, wherein identifying the one or more conditions within the vicinity of the vehicle as affecting the driving behavior of the vehicle comprises identifying one or more conditions affecting a probability of an accident for the vehicle.

* * * * *